United States Patent
Chen et al.

(10) Patent No.: US 7,339,637 B2
(45) Date of Patent: Mar. 4, 2008

(54) LIQUID CRYSTAL DISPLAY LIGHT SOURCE DEVICE

(75) Inventors: Wei Chou Chen, Hsinchu (TW); Mei Hui Lin, Yunghe (TW)

(73) Assignee: Hannstar Display Corp., Taipei (TW)

( * ) Notice: Subject to any disclaimer, the term of this patent is extended or adjusted under 35 U.S.C. 154(b) by 185 days.

(21) Appl. No.: 10/917,390

(22) Filed: Aug. 13, 2004

(65) Prior Publication Data

US 2005/0157516 A1    Jul. 21, 2005

(30) Foreign Application Priority Data

Jan. 16, 2004    (TW) ................................ 93101172 A

(51) Int. Cl.
*G02F 1/1335* (2006.01)
(52) U.S. Cl. .................... 349/65; 349/58; 349/67; 362/611; 362/632
(58) Field of Classification Search .................. 349/58, 349/65, 67, 61, 59; 362/555
See application file for complete search history.

(56) References Cited

U.S. PATENT DOCUMENTS

| | | | |
|---|---|---|---|
| 5,726,722 A * | 3/1998 | Uehara et al. ................. | 349/66 |
| 6,407,781 B2 | 6/2002 | Kitada | |
| 6,417,833 B1 | 7/2002 | Takemoto | |
| 6,783,256 B2 * | 8/2004 | Moon ........................... | 362/241 |
| 6,815,485 B2 * | 11/2004 | Kamo .......................... | 524/399 |
| 6,867,825 B2 * | 3/2005 | Kanatsu et al. ............... | 349/60 |
| 6,979,102 B2 * | 12/2005 | You .............................. | 362/218 |
| 6,997,582 B2 * | 2/2006 | Yang et al. ................... | 362/373 |
| 7,101,069 B2 * | 9/2006 | Yu et al. ....................... | 362/558 |
| 2002/0044437 A1 | 4/2002 | Lee | |
| 2002/0113924 A1 | 8/2002 | Saito et al. | |
| 2003/0123258 A1 * | 7/2003 | Nitto et al. .................. | 362/373 |
| 2004/0012763 A1 | 1/2004 | Yu et al. | |

FOREIGN PATENT DOCUMENTS

| | | | |
|---|---|---|---|
| JP | 1-138234 | * | 5/1989 |
| JP | 10-326517 | | 12/1998 |
| JP | 2002-116704 | | 4/2002 |

* cited by examiner

*Primary Examiner*—Thoi V. Duong

(57) ABSTRACT

A light source device includes a housing, a reflecting plate, at least one lamp support member and a plurality of lamps. The housing has a substantially flat bottom plate. The reflecting plate is disposed on the bottom plate of the housing. The lamp support member is disposed on the reflecting plate for forming an opening. The lamps are disposed in the opening and directly mounted by the lamp support member.

27 Claims, 9 Drawing Sheets

LIQUID CRYSTAL DISPLAY LIGHT SOURCE DEVICE

This application claims the priority benefit of Taiwan Patent Application Serial No. 093101172, filed Jan. 16, 2004, the full disclosure of which is incorporated herein by reference.

BACKGROUND OF THE INVENTION

1. Field of the Invention

This invention generally relates to a backlight module of a liquid crystal display, and more particularly to a backlight module which is easily assembled and has a good property for heat dissipating.

2. Description of the Related Art

Due to the advance of electronic technology, especially for the popularity of portable electronic products, the requirements of light, compact and low-energy consuming display are gradually increasing. With the advantages of low-energy consuming, low-heat dissipation, light weight and non-luminescence, liquid crystal displays (LCD) have been widely used in the electronic products and even have replaced the traditional CRT displays.

Referring to FIG. 1, it depicts the structure of a liquid crystal display in the prior art. In general, a liquid crystal display device includes a liquid crystal panel 10, and the liquid crystal panel 10 includes two substrates and a liquid crystal disposed therebetween. A backlight module is disposed under the liquid crystal panel 10 for distributing the light from a light source uniformly over the surface of the liquid crystal panel 10. These backlight modules typically include two types, i.e. a direct back light type and an edge light type. Furthermore, the liquid crystal display device typically further includes a front frame 11.

The prior art references have provided many backlight modules, e.g., U.S. Pat. No. 6,407,781 B2, issued Jun. 18, 2002 to Titada and U.S. Pat. No. 6,417,833 B1, issued Jul. 9, 2002 to Takemoto et al., which are both incorporated herein by reference.

Referring to FIG. 2, it shows a cross-sectional view of a direct back light type backlight module 21 taken along line 2-2 in FIG. 1. The direct back light type backlight module 21 includes a housing 70, a reflecting sheet 60 disposed at the base of the housing 70, lamps 50, such as cold cathode fluorescent lamps (CCFL), disposed at the base of the housing 70, a diffuser 40 disposed on the housing 70, and a plurality of optical sheets, such as a prism sheet 30 and a diffusing sheet 35, disposed on the diffuser 40.

The lamps 50 are spaced each other and disposed on a display area of the liquid crystal panel 10; therefore, the illumination distribution of the liquid crystal panel is not uniform. Typically, it is required to keep a predetermined distance or space between the lamps 50 and the diffuser 40. A spacer 55 of the housing 20 generally provides the predetermined distance or space.

Typically, the lamps 50 are mounted on a side wall of the housing 70 by a lamp fixture or a lamp support member (which is generally called). The lamp support member is quite rigid, and therefore a lamp rubber, which is made of silicon rubber for example, is disposed between the lamp support member and the lamp for acting as a damper. However, the housing 70, the lamp support member and the lamp rubber are respectively made of different materials, and are assembled in sequence, such that the assembling process need much time and manpower. Furthermore, the lamp support member and the lamp rubber are made of insulated material, and it is difficult to conduct the heat generated from the lamp, thereby resulting in the deformation of optical elements, e.g. the diffuser 40, the prism sheet 30 and the diffusing sheet 35, and further affecting the image quality of the LCD.

Referring to FIG. 3, it shows a cross-sectional view of an edge light type backlight module 21 taken along line 2-2 in FIG. 1. The edge light type backlight module 22 includes a light guide 80, lamps 50 disposed at one or two sides of the light guide 80 and an U-shaped reflector 61 enclosing the lamp 50. An opening portion of the reflector 61 is mounted at the side of the light guide 80, a reflecting sheet 60 is mounted at the bottom of the light guide 80, a diffusing sheet 35 is mounted over the light guide 80, and a prism sheet 30 is mounted over the diffusing sheet 35. The lamp 50 is disposed at the edge of the light guide 80, and the thickness of the LCD can be decreased. Similarly, according to the edge light type backlight module 22, the heat generated from the lamp 50 may also cause the deformation of the diffusing sheet 35 or the light guide 80, and further affect the image quality of the LCD.

Accordingly, there is a need for providing a liquid crystal display which has a simple structure, is easily assembled and dissipating the heat generated from a lamp.

SUMMARY OF THE INVENTION

It is an object of the present invention to provide a liquid crystal display having a lamp support member which is integrally formed so as to be easily assembled.

It is another object of the present invention to provide a lamp support member of a liquid crystal display which is made of thermally conductive material capable of dissipating the heat generated from a lamp.

It is a further object of the present invention to provide a backlight module of a liquid crystal display having a good heat dissipating property and light weight.

In order to achieve the above objects, the present invention provides a light source device including a housing, a reflector unit, at least one lamp support member and a plurality of lamps. The housing has a substantially flat bottom plate. The reflector unit adjacent to the bottom plate of the housing. The lamp support member is disposed on the reflector unit having at least one opening. The lamps are disposed in the opening and directly mounted by the lamp support member, wherein the lamp support member is made of thermally conductive material and the thermally conductivity of the thermally conductive material is more than 0.5 W/mk.

The light source device for a liquid crystal display according to the present invention has an integral structure and a light weight and is easily assembled. Furthermore, the light source device for a liquid crystal display according to the present invention has an appropriate heat dissipating path for the heat generated by the lamp, such that the liquid crystal display has an uniform temperature distribution.

The lamp support member according to the present invention has a plurality of grooves for accommodating the lamps and further has a plurality of racks. The racks can be acted as a supporting bottom plate, thereby substantially decreasing the weight of the light source device. Furthermore, a support pin and lamp holders are joined to each other and further disposed on the rack.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE PREFERRED EMBODIMENT

Figure 1:
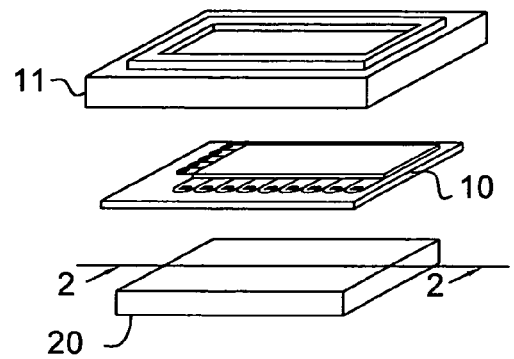
FIG. 1 is an exploded perspective schematic view of a liquid crystal display in the prior art.
Figure 2:
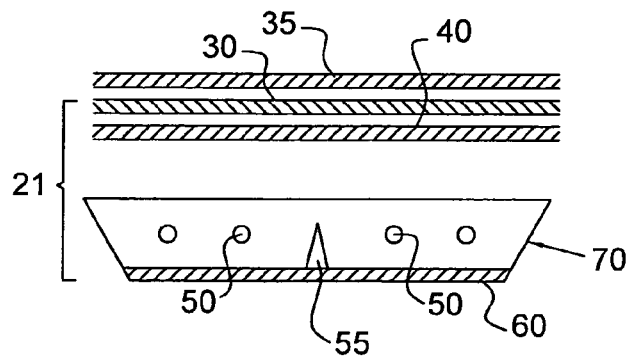
FIG. 2 is a cross-sectional schematic view of a direct back light type backlight module in the prior art.
Figure 3:
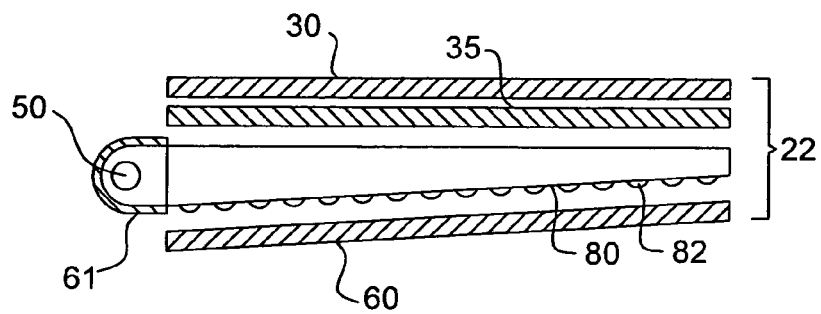
FIG. 3 is a cross-sectional schematic view of a edge light type backlight module in the prior art.
Figure 4:
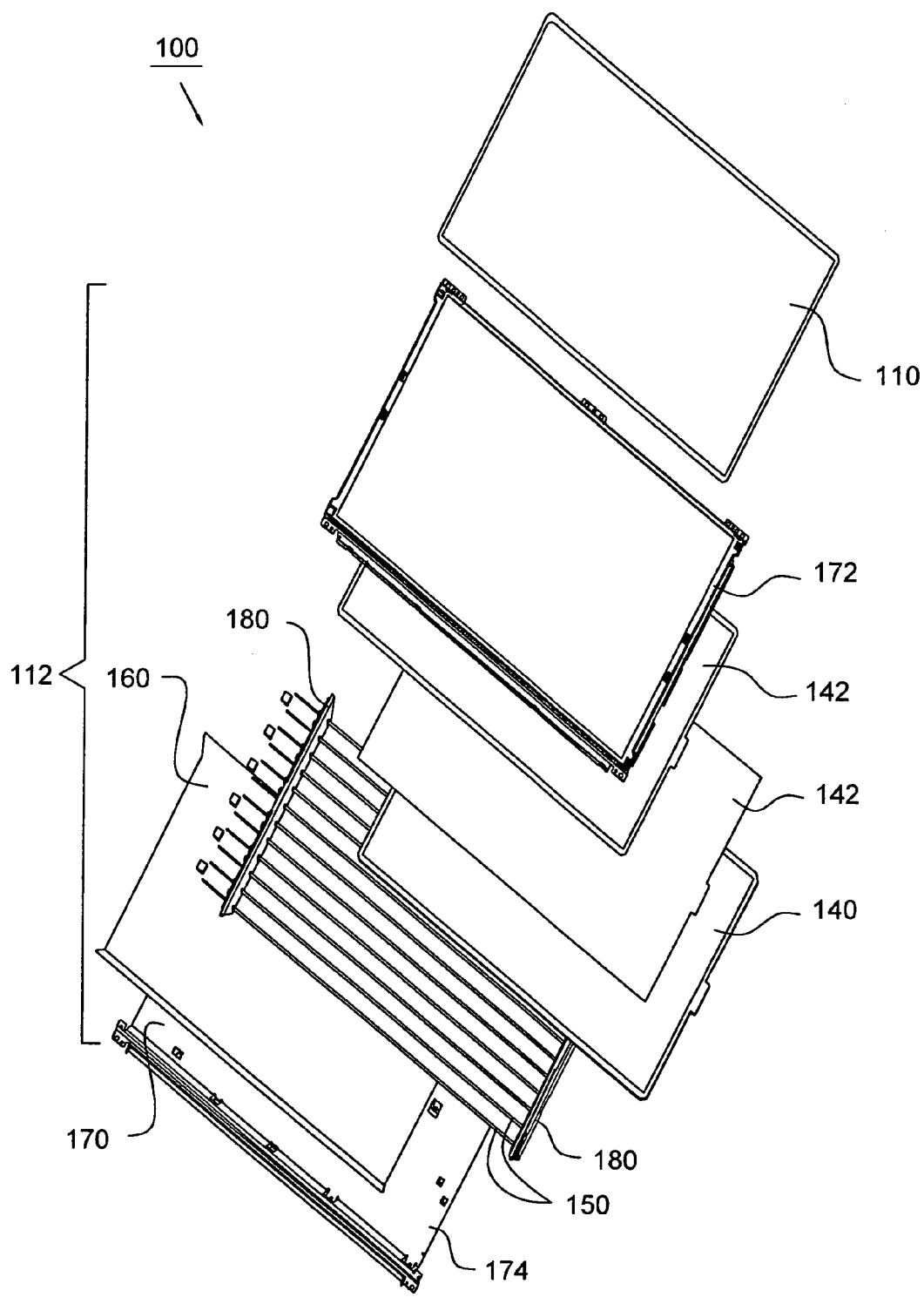
FIG. 4 is an exploded perspective schematic view of a liquid crystal display according to an embodiment of the present invention.

Referring to FIG. 4, it depicts a liquid crystal display 100 according to an embodiment of the present invention. The liquid crystal display (LCD) 100 includes a liquid crystal panel 110 for producing an image and a light source device, e.g. a backlight module 112 for emitting light to the liquid crystal panel 110. The backlight module 112 is a direct back light type. The liquid crystal panel 110 includes printed circuit boards (PCB) (not shown) for transmitting control and driving signals to the liquid crystal panel 110 via Tape Carrier Package (TCP).

The backlight module 112 includes a housing 170, which has a metal frame 172 and a bottom plate 174 for accommodating a plurality of lamps 150 such as cold cathode fluorescent lamps (CCFL). A reflecting plate 160 is disposed on the bottom plate 174 of the housing 170. A diffuser 140 and a plurality of optical sheets 142, such as a diffusing sheet and a prism sheet, are disposed between the lamps 150 and the liquid crystal panel 110.

Figure 5:
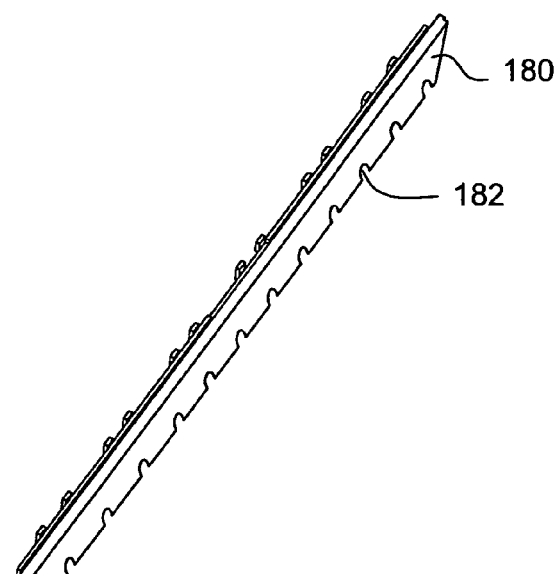
FIG. 5 is a perspective schematic view of a lamp support member of the liquid crystal display shown in FIG. 4.
Figure 6:
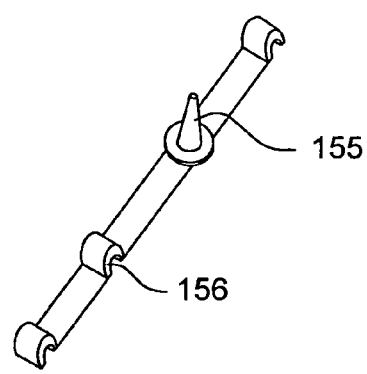
FIG. 6 is a perspective schematic view of a support pin and lamp holder according to another embodiment of the present invention.

Two lamp support members 180 are disposed at two sides and have a plurality of opening 182 for mounting the lamps 150, shown in FIG. 5. Referring to FIG. 6, a support pin 155 which can be joined to a plurality of lamp holders 156 is disposed on the reflecting plate 160 or the bottom plate 174. The lamp holder 156 positions the lamps at a fixed position.

The lamp support member 180 of the present invention can be integrally made of silicon rubber and the lamp support member 180 itself can just act as a damper. Alternatively, the lamp support member 180, the bottom plate 174, the support pin 155 and the lamp holders 156 are integrally formed so as to decrease the assembly step or manufacture process of the LCD.

Furthermore, the lamp support member 180, the bottom plate 174, the support pin 155 and the lamp holders 156 can also be made of thermally conductive rubber materials, e.g. Polyphenylene sulfide (PPS) under product name of RS012, thermally conductive thermoplastic elastomer (TPE) under product name of RS082 produced by CoolPoly company, Warwick, R. I., U.S. and product name SR600E produced by WHAYUEB TECHNOLOGY CO., Ltd, Hsinchu, Taiwan.

In an experiment, the lamp support member 180 is integrally made of material with thermally conductivity 1 W/mk (product name SR600E produced by WHAYUEB TECHNOLOGY CO., Ltd). Compared with conventional LCD, the temperature difference between different locations of the LCD with the lamp support member 180 is decreased to 9 degrees centigrade, whereby the LCD of the present invention effectively decreases unevenness of temperature. In an actual embodiment, the thermally conductivity of material for making the lamp support member 180 is preferably more than 0.5 W/mk.

Furthermore, the housing 170 of the backlight module 112 of the liquid crystal display 100 of the present invention is also made of thermally conductive rubber material. Alternatively, the housing 170, the lamp support member 180, the bottom plate 174, the support pin 155 and the lamp holders 156 are also integrally formed. For above reason, the heat generated from the lamps 150 is directly conducted to the housing 170.

Also, the housing 170, the lamp support member 180, the bottom plate 174, the support pin 155 and the lamp holders 156 are made of the material which prevents electromagnetic interference (EMI), e.g. product name MASA sheet TD/TE sold by INOAC company, Nagoya, Japan, thereby increasing the efficiency of grounding and avoiding electromagnetic interference.

Figure 7:
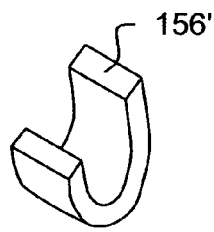
FIG. 7 is a perspective schematic view of a lamp holder according to another embodiment of the present invention.
Figure 7A:
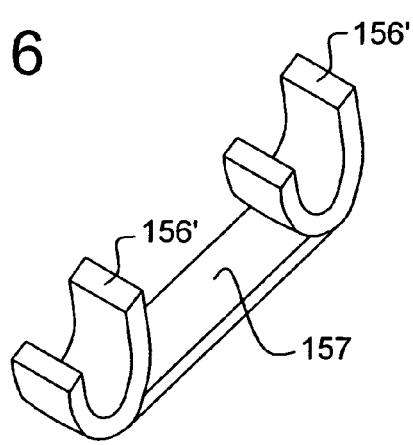
FIG. 7a is a perspective schematic view of a lamp holder according to another embodiment of the present invention.

Referring to FIG. 7, it depicts a lamp O-ring 156' according to an embodiment of the present invention. The lamp O-ring 156' is substantially U-shaped, such that during assembly of the LCD 100 the lamp 150 is not requested to pass through the lamp O-ring 156' and can be directly pressed to the lamp O-ring 156' and positioned at a correct position. Alternatively, the two lamp O-ring 156' can be connected to each other by a connecting arm 157, shown in FIG. 7a. The connecting arm 157 has a substantially flat bottom, which can adhere to the bottom plate 174 or the reflecting plate 160. The lamp O-ring 156' can be of other shapes with an opening, e.g. C-shaped or S-shaped sections. Also, the width of the opening of the lamp O-ring 156' is slightly smaller than the diameter of the lamp 150 so as to prevent the lamp 150 from slipping outside the lamp O-ring 156'.

Figure 8:
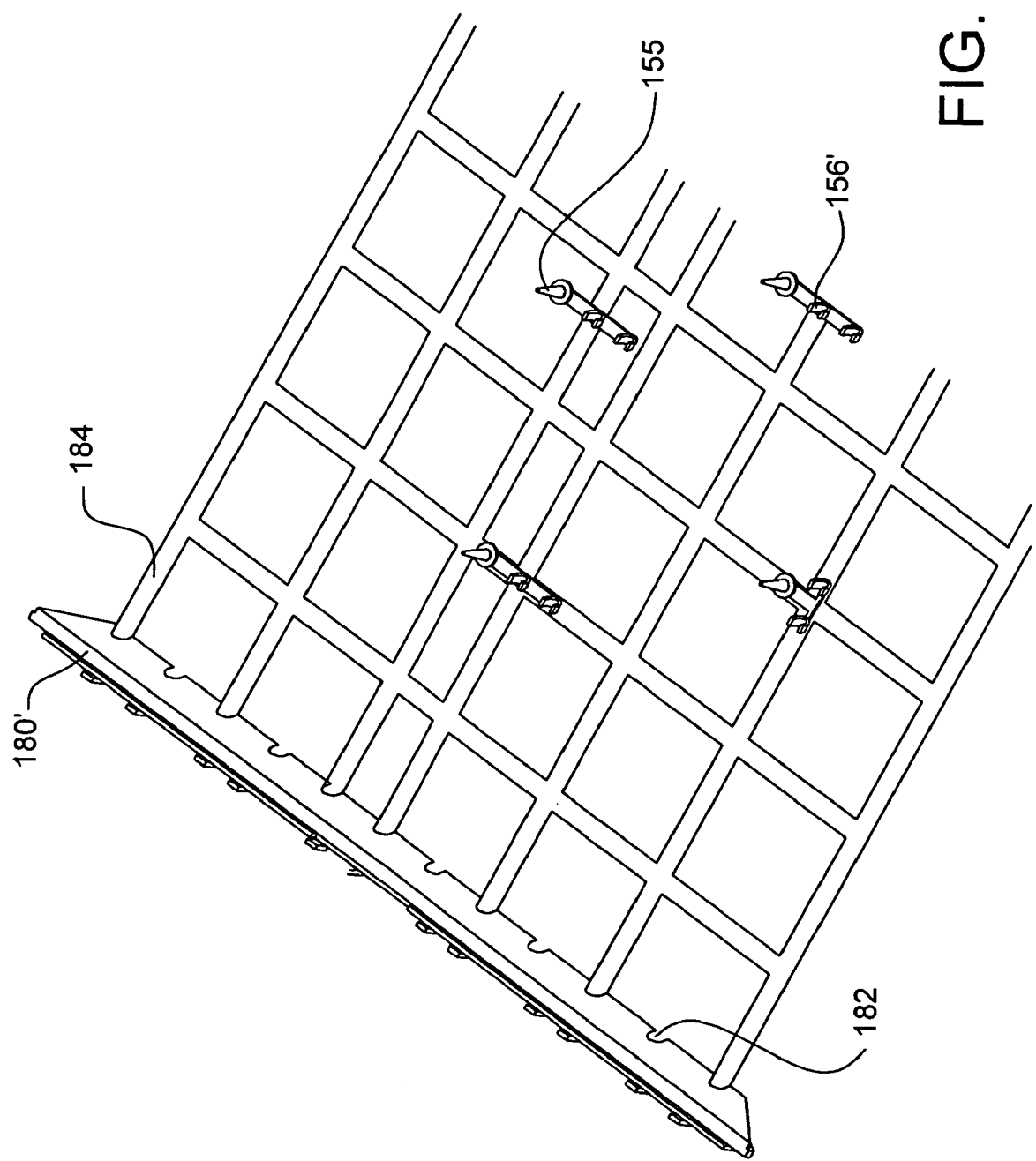
FIG. 8 is a perspective schematic view of a lamp support member and rack according to another embodiment of the present invention.

Referring to FIG. 8, it depicts a lamp support member 180' according to another embodiment of the present invention. The lamp support member 180' has a plurality of openings 182 for accommodating the lamps 150 and further has a plurality of racks 184. The racks 184 can act as a supporting bottom plate instead of the plate-shaped bottom plate shown in figure, thereby substantially decreasing the weight of the backlight module. In the embodiment shown in figure, the support pin 155 and the two lamp O-rings 156' are joined to each other and further disposed on the rack 184. For less redundancy, the support pin 155 and the two lamp O-rings 156' are joined to each other by using any joining manner.

Figure 9:
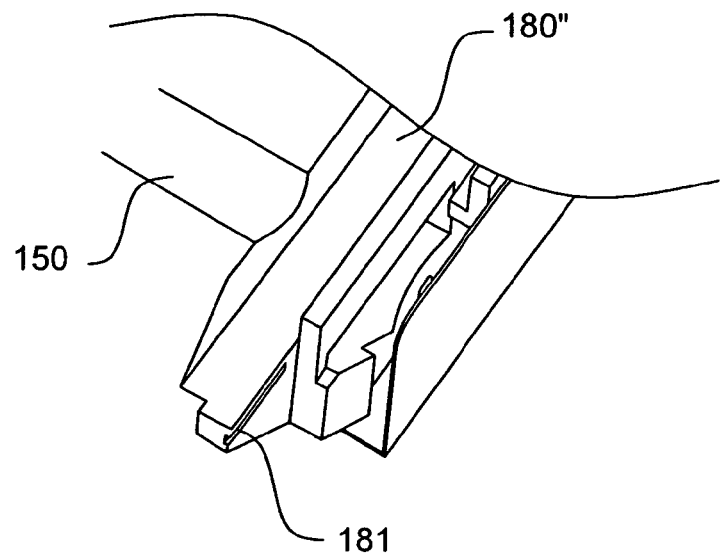
FIG. 9 is a partially enlarged perspective schematic view of a lamp support member according to another embodiment of the present invention.
Figure 10:
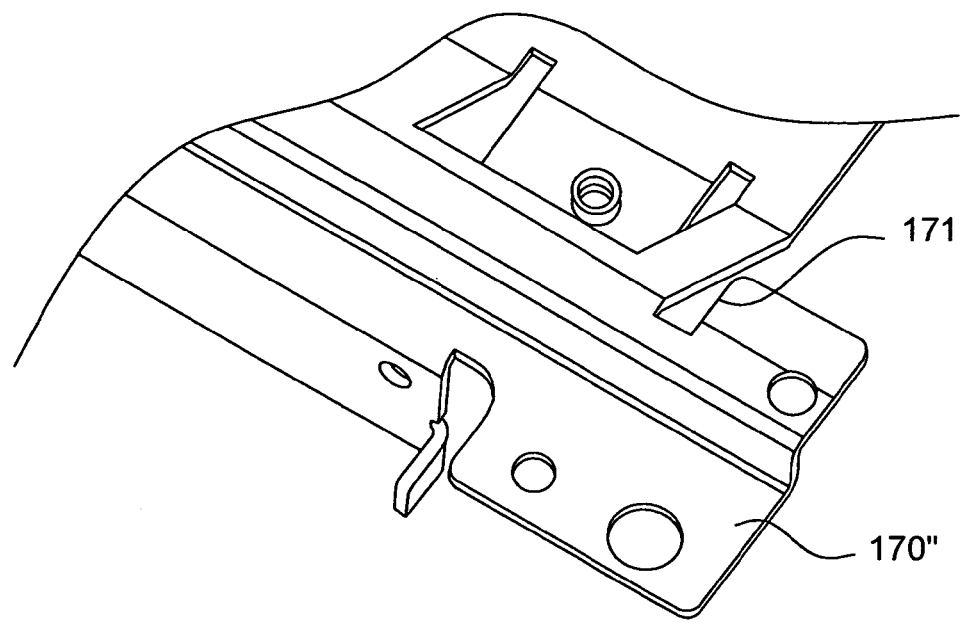
FIG. 10 is a partially enlarged perspective schematic view of a housing according to another embodiment of the present invention.

Referring to FIGS. 9 and 10, they depict a lamp support member 180" and a housing 170" according to a further embodiment of the present invention. The lamp support member 180" fixes lamps 150 and has a groove 181. The housing 170" is made of metal and has a substantially vertical wall 171. During assembly, the groove 181 of the lamp support member 180" is engaged with the substantially vertical wall 171 of the housing 170" so as to easily facilitate the assembly process.

Figures 11, 12:
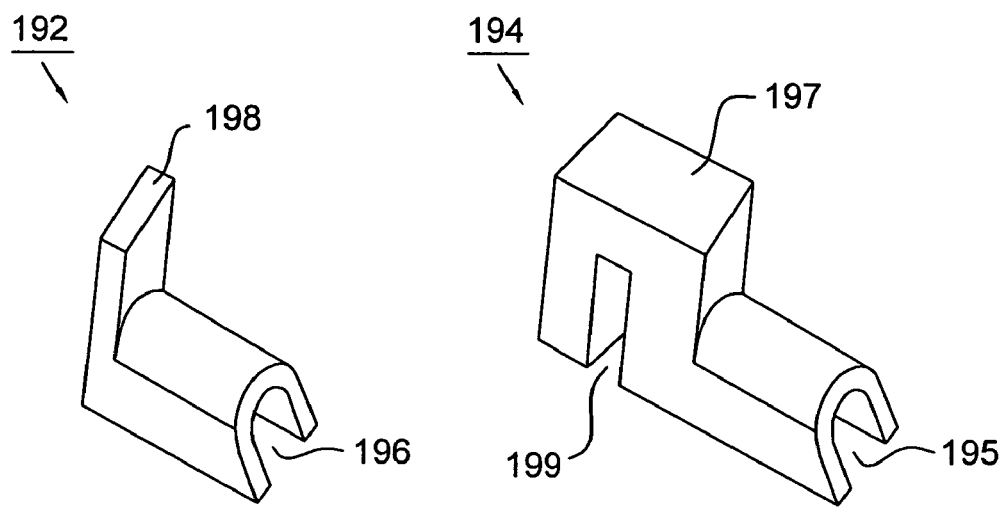
FIG. 11 is a perspective schematic view of a lamp rubber according to an embodiment of the present invention.
FIG. 12 is a perspective schematic view of a lamp rubber according to another embodiment of the present invention.

Referring to FIG. 11, it depicts a lamp rubber 192 according to an embodiment of the present invention. The lamp rubber 192 has a receiving portion e.g. a U-shaped recess 196 for accommodating the lamp 150 and has a protrusion 198.

Referring to FIG. 12, it depicts a lamp rubber 194 according to another embodiment of the present invention. The lamp rubber 194 has a U-shaped recess 195 for accommodating the lamp 150 and has a protrusion 197. The protrusion has a narrow groove 199.

Figure 13:
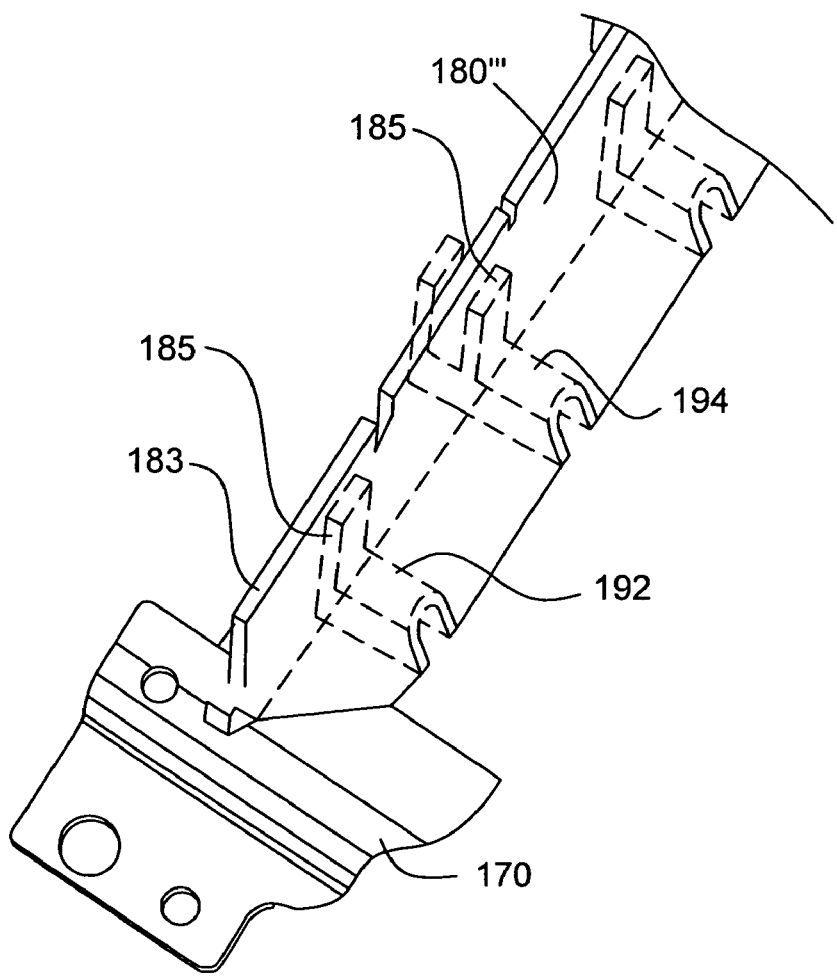
FIG. 13 is a perspective schematic view of a lamp support member according to another embodiment of the present invention.

Referring to FIG. 13, it depicts a lamp support member 180''' according to a still further embodiment of the present invention. The lamp support member 180''' is mounted on a housing 170 and has a substantially vertical wall 183. The substantially vertical wall 183 has recesses 185 (the broken lines shown in figure). The protrusion 198 of the lamp rubber 192 is embedded into the recess 185, and then is mounted by the lamp support member 180'''. Furthermore, the protrusion 197 of the lamp rubber 194 is also embedded into the recess 185, the narrow groove 199 of the protrusion 198 is further engaged with the vertical wall 183, such that the lamp rubber 194 is securely mounted by the lamp support member 180'''.

Figure 14:
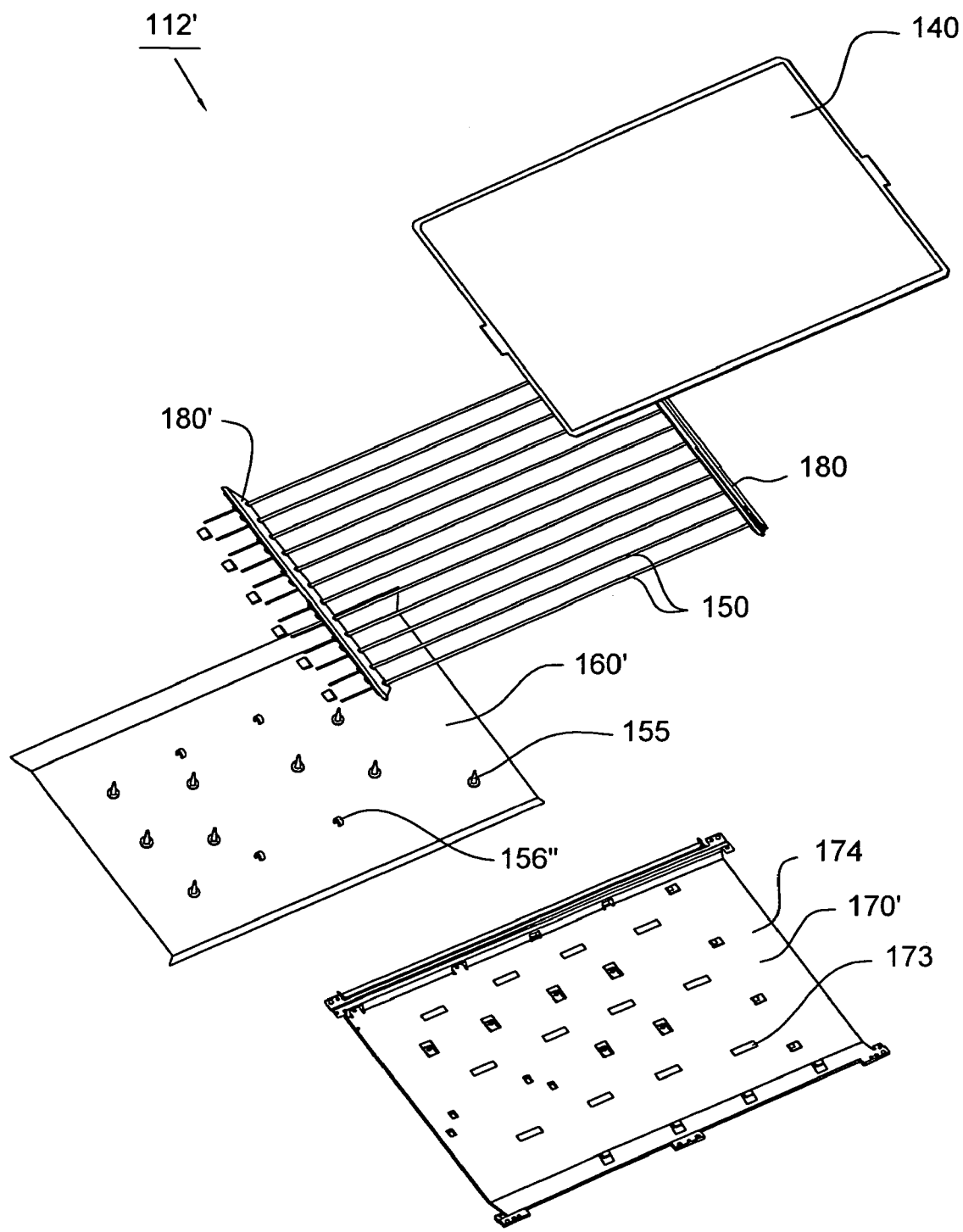
FIG. 14 is an exploded perspective schematic view of a backlight module according to an embodiment of the present invention.

Referring to FIG. 14, it depicts a backlight module 112' according to another embodiment of the present invention. The backlight module 112' is similar to the backlight module 300 wherein the similar elements are designated with the similar reference numerals. The backlight module 112' includes a housing 170', which has a plurality of thermally conductive tapes 173 disposed the bottom plate 174 of the housing 170'. The backlight module 112' also includes a reflecting plate 160', wherein the reflecting plate 160' and the support pins 155 can be integrally formed. The reflecting plate 160' is disposed on the bottom plate 174 of the housing 170' and contacts the thermally conductive tapes 173, such that the heat generated by the lamps 150 is conduced to the bottom plate 174 of the housing 170' via the thermally conductive tapes 173. The backlight module 112' further has a plurality of lamp holders 156" disposed on the reflecting plate 160'. The lamp holders 156" and the reflecting plate 160' can be also integrally formed.

Figure 15:
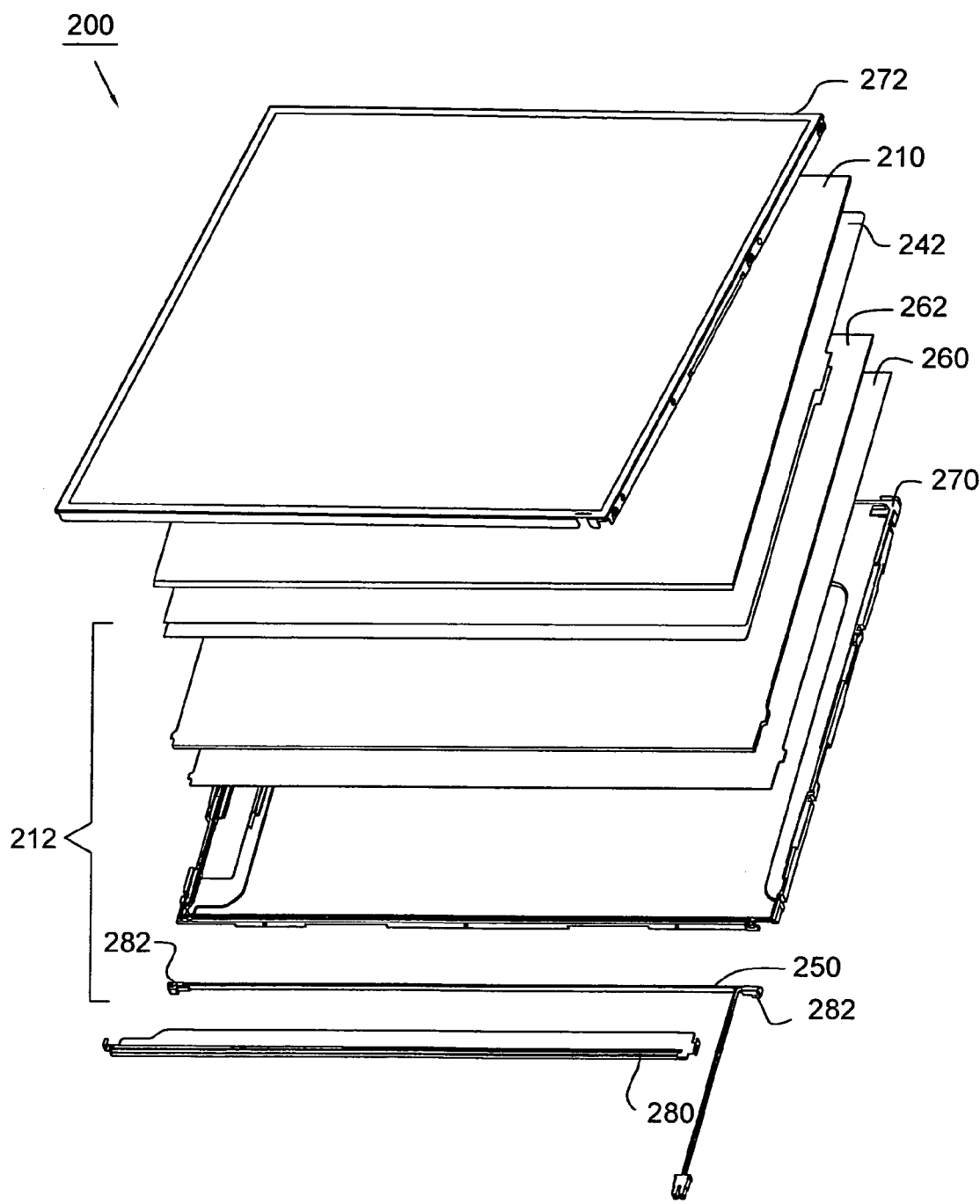
FIG. 15 is an exploded perspective schematic view of a liquid crystal display according to a further embodiment of the present invention.

Referring to FIG. 15, it depicts a liquid crystal display 200 according to another embodiment of the present invention. The liquid crystal display 200 includes a liquid crystal panel 210 for producing an image and a light source device, e.g. a backlight module 212 for emitting light to the liquid crystal panel 210. The backlight module 212 is an edge light type. The liquid crystal panel 210 includes printed circuit boards (PCB) (not shown) for transmitting control and driving signals to the liquid crystal panel 210 via Tape Carrier Package (TCP).

The backlight module 212 includes a light guiding plate 262, a lamp 250 installed at a side of the light guiding plate 262, and a U-shaped reflector 280 surrounding the lamp 250. An opening of the U-shaped reflector 280 is adjacent to the side of the light guiding plate 262. A reflecting sheet 260 is adjacent to the light guiding plate 262. A plurality of optical components 240, such as a diffusing sheet and a prism sheet, are disposed on the light guiding plate 262. The liquid crystal display 200 further includes a housing 270 and a front frame 272 for supporting the liquid crystal panel 210 and the backlight module 212.

The light guiding plate 262 has an incident surface facing the lamp 250 and a transmissive surface facing liquid crystal panel 210, wherein the light is transmitted to the light guiding plate 262 via the incident surface and then transmitted outside the light guiding plate 262 via the transmissive surface. The reflector 280 is disposed at one end of the incident surface of the light guiding plate 262 for accommodating the lamp 250 and defining a lengthwise direction, wherein the reflector 280 has two side walls disposed two ends of the lengthwise direction of the reflector 280.

Figure 16:
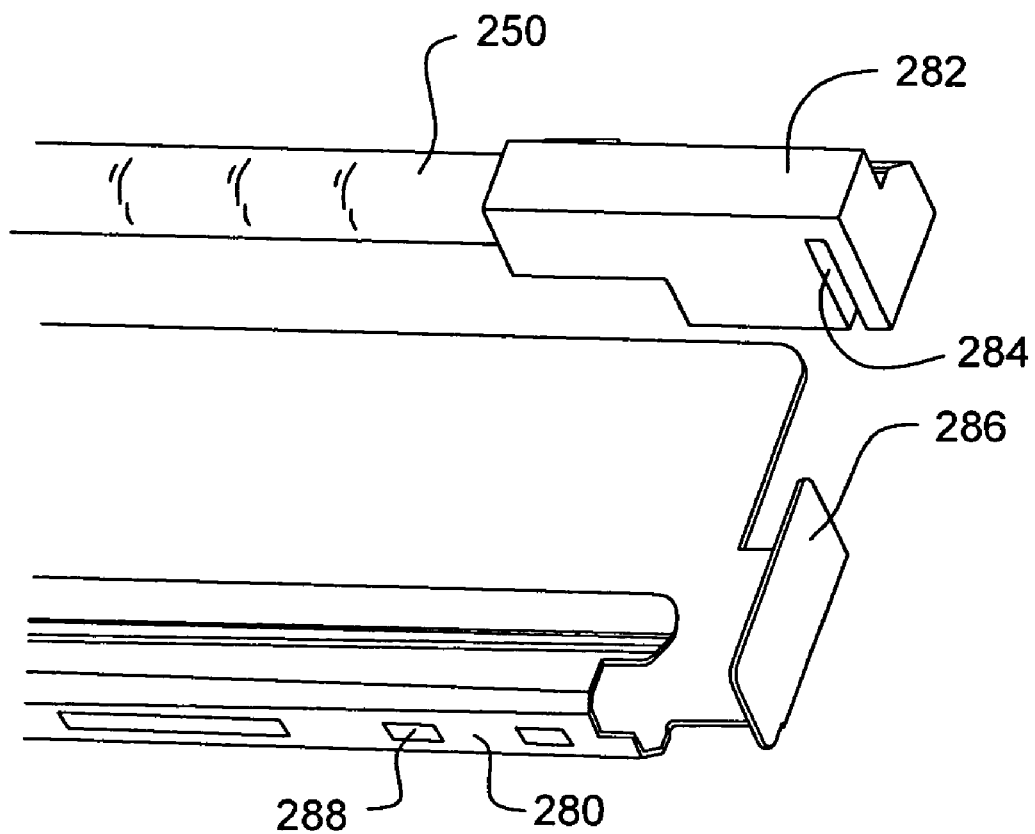
FIG. 16 is a partially enlarged perspective schematic view of a reflector of the liquid crystal display shown in FIG. 15.

The lamp 250 is mounted on the reflector 280 by means of two lamp rubbers 282. Referring to FIG. 16, the lamp rubbers 282 further has a groove 284 for embedding a side wall 286 of the reflector 280, such that the lamp rubbers 282 are easily mounted and installed on the reflector 280. It is apparent to one of ordinary skill in the art that a lamp O-ring 156' (referring to FIG. 7) can be substantially U-shaped and disposed inside the reflector 280, such that during assembly of the LCD 200 the lamp 250 can be directly pressed to the lamp O-ring 156' and positioned at a correct position. Alternatively, the two lamp O-ring 156' can be connected to each other by a connecting arm 157, shown in FIG. 7a. The connecting arm 157 has a substantially flat bottom, which can adhere to the reflector 280. The lamp O-ring 156' can be of other shapes with an opening, e.g. C-shaped or S-shaped sections. Also, the width of the opening of the lamp O-ring 156' is slightly smaller than the diameter of the lamp 150 so as to prevent the lamp 250 from slipping outside the lamp O-ring 156'.

Furthermore, the reflector 280 is provided with a plurality of thermally conductive element e.g. thermally conductive tapes 288 disposed on a side thereof. When the backlight module 212 is joined with the liquid crystal panel 210, the thermally conductive tapes 288 is disposed between two of the reflector 280, the front frame 272 and the housing 270, such that the heat generated by the lamp 250 is conducted to the front frame 272 via the reflector 280 and the thermally conductive tapes 288. Also, the front frame 272 is typically made of metal capable of facilitating the heat dissipating.

As described above, the backlight module of the liquid crystal display according to the present invention has an integral structure and a light weight and is easily assembled. Furthermore, the backlight module of the liquid crystal display according to the present invention has an appropriate heat dissipating path for dissipating heat generated by the lamp, such that the liquid crystal display has an uniform temperature distribution.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A light source device, comprising:
   a housing having a substantially flat bottom plate;
   a reflector unit adjacent to the bottom plate of the housing;
   at least one lamp support member disposed on the reflector unit and having at least one opening;
   at least one lamp disposed in the opening and directly mounted by the lamp support member, wherein the lamp support member acts as a damper and is made of thermally conductive material having a thermal conductivity of more than 0.5 W/mk; and
   a lamp rubber having a protrusion for embedding into the lamp support member and a receiving portion for accommodating the lamp;
   wherein the housing further has a wall, and the protrusion of the lamp rubber has a groove engaged with the wall of the housing.

2. The light source device as claimed in claim 1, further comprising:
   a lamp holder disposed on the reflector unit, wherein the lamp holder and the housing are integrally formed.

3. The light source device as claimed in claim 1, further comprising:
   a lamp holder disposed on the reflector unit, wherein the lamp holder and the reflector unit are integrally formed.

4. The light source device as claimed in claim 1, further comprising:
   a lamp holder disposed on the reflector unit and made of thermally conductive material with a thermal conductivity of more than 0.5 W/mk.

5. The light source device as claimed in claim 1, further comprising:
   a support pin disposed on the reflector unit, wherein the support pin is made of thermally conductive material with a thermally conductivity of more than 0.5 W/mk.

6. The light source device as claimed in claim 1, wherein the lamp support member is made of elastomer material.

7. The light source device as claimed in claim 1, further comprising:
   a support pin penetrated through the reflector unit, wherein the support pin and the housing are integrally formed.

8. The light source device as claimed in claim 1, further comprising:
   a lamp holder and a support pin, wherein the lamp support member comprising a rack, the lamp holder and the support pin are integrally formed and mounted on the rack.

9. The light source device as claimed in claim 1, wherein the lamp rubber is made of thermally conductive material having a thermal conductivity of more than 0.5 W/mk.

10. The light source device as claimed in claim 1, wherein the lamp support member is made of an electromagnetic interference (EMI) shielding material.

11. The light source device as claimed in claim 1, wherein the lamp support member is made of thermally conductive rubber material.

12. The light source device as claimed in claim 1, wherein the lamp support member is integrally made of silicon rubber.

13. A liquid crystal display, comprising:
    a liquid crystal panel;
    a light source device comprising:
       a lamp for generating light;
       a light guiding unit having an incident surface facing the lamp and a transmissive surface facing the liquid crystal panel, wherein the light generated by the lamp is transmitted to the light guiding unit via the incident surface and then transmitted outside the light guiding unit via the transmissive surface;
       a reflector adjacent to the light guiding unit for accommodating the lamp and defining a lengthwise direction, wherein the reflector has two side walls disposed at two ends of the lengthwise direction of the reflector; and
       at least one lamp support member supporting the lamp and having a groove engaged with one of the side walls;
    a housing accommodating the light source device; and
    a frame accommodating the liquid crystal panel, such that the light source device and the liquid crystal panel are mounted between the frame and the housing.

14. The liquid crystal display as claimed in claim 13, further comprising:
    a thermally conductive element disposed in the lengthwise direction of the reflector, and between the reflector and the housing.

15. The liquid crystal display as claimed in claim 14, wherein the thermally conductive element is made of thermally conductive material with a thermal conductivity of more than 0.5 W/mk.

16. The liquid crystal display as claimed in claim 13, further comprising:
    a thermally conductive element disposed between the frame and the housing.

17. The liquid crystal display as claimed in claim 13, wherein the lamp support member is made of thermally conductive material with a thermal conductivity of more than 0.5 W/mk.

18. The liquid crystal display as claimed in claim 13, further comprising:
    a lamp holder disposed in the lengthwise direction of the reflector for positioning the lamp.

19. The liquid crystal display as claimed in claim 18, wherein the lamp holder has a shape selected from the group consisting of U-shaped, C-shaped and S-shaped sections.

20. A liquid crystal display, comprising:
    a liquid crystal panel for producing an image;
    a frame accommodating the liquid crystal panel; and
    a light source device comprising:
       a housing;
       a reflector unit adjacent to the housing;
       at least one lamp support member disposed on the reflector unit and having at least one opening which is a U-shaped recess facing the reflector unit; and
       at least one lamp disposed in the U-shaped recess, physically touching the U-shaped recess, and mounted by disposing the U-shaped recess of the lamp support member to the reflector unit, wherein the lamp support member is made of thermally conductive material with a thermal conductivity of more than 0.5 W/mk.

21. The liquid crystal display as claimed in claim 20, further comprising:
    a lamp holder adjacent to the reflector unit, wherein the lamp holder and the housing are integrally formed.

22. The liquid crystal display as claimed in claim 20, wherein the housing is a net-shaped component.

23. The liquid crystal display as claimed in claim 20, further comprising:

a lamp holder and a support pin disposed on the reflector unit, wherein the lamp holder, the support pin and the housing are integrally formed.

24. The liquid crystal display as claimed in claim 20, further comprising:

a lamp rubber having a protrusion for embedding into the lamp support member and a receiving portion for accommodating the lamp.

25. The liquid crystal display as claimed in claim 20, wherein the housing further has a wall, and the protrusion of the lamp rubber has a groove engaged with the wall of the housing.

26. The liquid crystal display as claimed in claim 20, wherein the housing further has a wall, and the lamp support member has a groove engaged with the wall of the housing.

27. The liquid crystal display as claimed in claim 20, wherein the housing has a thermally conductive element disposed between the housing and the reflector unit.

* * * * *